United States Patent
Mula et al.

(10) Patent No.: US 12,130,745 B2
(45) Date of Patent: Oct. 29, 2024

(54) HASH FUNCTION WITH PERFECT HASH COMPONENT

(71) Applicant: MELLANOX TECHNOLOGIES, LTD., Yokneam (IL)

(72) Inventors: Liron Mula, Yokneam (IL); Avi Urman, Yokneam (IL)

(73) Assignee: MELLANOX TECHNOLOGIES LTD., Yokneam (IL)

( * ) Notice: Subject to any disclaimer, the term of this patent is extended or adjusted under 35 U.S.C. 154(b) by 55 days.

(21) Appl. No.: 18/073,586

(22) Filed: Dec. 2, 2022

(65) Prior Publication Data
US 2024/0184709 A1 Jun. 6, 2024

(51) Int. Cl.
G06F 12/00 (2006.01)
G06F 12/0802 (2016.01)
G06F 12/0893 (2016.01)
H04L 9/06 (2006.01)

(52) U.S. Cl.
CPC ...... G06F 12/0893 (2013.01); G06F 12/0802 (2013.01); H04L 9/0643 (2013.01)

(58) Field of Classification Search
CPC .......................... G06F 12/0893; G06F 12/0802
See application file for complete search history.

(56) References Cited

U.S. PATENT DOCUMENTS 10,146,697 B1 * 12/2018 Duggal ................ G06F 3/0641
11,853,454 B1 * 12/2023 Tarsi ..................... G06F 21/602
2007/0245119 A1 * 10/2007 Hoppe ................ H04L 45/7453
                                                                707/E17.025
2020/0117546 A1 * 4/2020 Wong .................... G06F 16/137
2022/0147453 A1 * 5/2022 Kounavis ................ H04L 9/32

OTHER PUBLICATIONS

NVIDIA Corporation, "NVIDIA CONNECTX-7 400G ETHERNET—Smart Acceleration for Cloud, Data-Center and Edge," Datasheet, pp. 1-2, year 2021, as downloaded from nvidia.com/content/dam/en-zz/Solutions/networking/ethernet-adapters/connectx-7-datasheet-Final.pdf.
NVIDIA Corporation, " NVIDIA Announces Spectrum High-Performance Data Center Networking Infrastructure Platform," Press Release, pp. 1-2, Mar. 22, 2022, as downloaded from nvidianews.nvidia.com/news/nvidia-announces-spectrum-high-performance-data-center-networking-infrastructure-platform.
Wikipedia, "Equal-cost Multi-path Routing (ECMP)," pp. 1-2, last updated Janury 13, 2022, as downloaded from https://web.archive.org/web/20221129185637/https://en.wikipedia.org/wiki/Equal-cost_multi-path_routing.

* cited by examiner

*Primary Examiner* — John A Lane
(74) *Attorney, Agent, or Firm* — MEITAR PATENTS LTD.

(57) ABSTRACT

A caching system operative in conjunction with a memory and a cache, the caching system comprising a processor to use only a single hash function which compresses K bit memory addresses to $H\_max$ bit cache addresses, rather than using plural hash functions, to provide perfect hashing for each of plural applications which utilize plural respective subsets, of different sizes, from among $2^{H\_max}$ cells in the cache; and at least one logic circuit X which receives, as one of its input operands, an output, $H\_max$ bits in length, of the single hash function and which generates, as a logic circuit output, a cache address of length $H\_select$ to which at least one K-bit address is mapped where $H\_max<K$, to ensure that input operands which differ only by $H\_select<=H\_max$ bits, map to distinct hash values with no collisions.

18 Claims, 3 Drawing Sheets

HASH FUNCTION WITH PERFECT HASH COMPONENT

FIELD

This disclosure relates generally to hashing, and more specifically to hashing of cache keys.

BACKGROUND

NVIDIA® ConnectX® is described online here: nvidia.com/content/dam/en-zz/Solutions/networking/ethernet-adapters/connectx-7-datasheet-Final.pdf.

The NVIDIA Spectrum-4 switch is described online here: nvidianews.nvidia.com/news/nvidia-announces-spectrum-high-performance-data-center-networking-infrastructure-platform.

Wikipedia's entry on Equal-cost multi-path routing describes that "Equal-cost multi-path routing (ECMP) is a routing strategy where packet forwarding to a single destination can occur over multiple best paths with equal routing priority. Multi-path routing can be used in conjunction with most routing protocols because it is a per-hop local decision made independently at each router. It can substantially increase bandwidth by load-balancing traffic over multiple paths; however, there may be significant problems in deploying it in practice . . . . Load balancing by per-packet multipath routing was generally disfavored due to the impact of rapidly changing latency, packet reordering and maximum transmission unit (MTU) differences within a network flow, which could disrupt the operation of many Internet protocols, most notably TCP and path MTU discovery. RFC 2992 analyzed one particular multipath routing strategy involving the assignment of flows through hashing flow-related data in the packet header. This solution is designed to avoid these problems by sending all packets from any particular network flow through the same path while balancing multiple flows over multiple paths."

SUMMARY

Applications often need to retrieve content which resides in a database; for efficiency, caching is used to improve performance. However, there may be, say, one million addresses from 1 to 1M in the database, where, in the cache (aka "$") there may be, say only 100 addresses from 0 to 100, and collisions are undesirable, because each occurrence of a collision may force the application to access the database rather than accessing the cache, to the detriment of the application's performance (e.g., power and/or latency).

Typically, the application seeks to read a certain (database) address x, the read operation resulting in an address (x) and value (y) being returned to the application. The cache may have a compression function e.g., hash circuitry which accepts a database address x and returns H. Typically, the cache response includes a key and a value, where, typically, each cache cell H includes a value y, which is stored in the database in memory cell x, whereas the "key" indicates that the memory cell in the database, in which this value y is stored, is memory cell x.

The hash function may comprise a perfect hash for compressing K bit values to $H\_max$ bit values, where a "perfect" hash maps distinct elements with zero collisions. It is appreciated that a hash function which constitutes a perfect hash for compressing K bit values to $H\_max$ bit values, or a perfect hash for compressing consecutive $2^{H\_max}$ K-bit values to non-colliding $H\_max$ bit values, is not, standalone, a perfect hash for compressing K bit values to $H\_select$ bit values where $H\_select$ (aka $H\_sel$) differs from (e.g., is smaller than) $H\_max$.

Certain embodiments provide a hash function which is not a perfect hash but does have a perfect-hash component. For example, a generic hash function with a perfect-hash component may comprise a hash function which is imperfect generally, yet is perfect for some, but not all, bits being compressed.

At least the following embodiments are provided:

Embodiment 1. A caching system operative in conjunction with a memory and a cache, the caching system comprising a processor to use, typically, only a single hash function which may compress K bit memory addresses to $H\_max$ bit cache addresses, rather than using plural hash functions, to provide perfect hashing for each of plural applications which may utilize plural respective subsets, which may be of different sizes, from among, say, $2^{H\_max}$ cells in the cache; and/or at least one logic circuit X which may receive, e.g., as one of its input operands, an output, typically $H\_max$ bits in length, of the single hash function and which may generate, e.g., as a logic circuit output, a cache address e.g., of length $H\_select$ to which, typically, at least one K-bit address is mapped where $H\_max<K$, e.g., to ensure that input operands which differ only by $H\_select<=H\_max$ bits, map to distinct hash values, typically with no collisions.

Embodiment 2. The system according to any of the preceding embodiments wherein the processor receives at least:
 a K-bit address representing an address in the memory, and
 an input defining a configurable size $H\_select$ of a subset of the $2^{H\_max}$ cache cells which a given application from among the plural applications utilizes.

Embodiment 3. The system according to any of the preceding embodiments wherein the processor generates at least:
 a first output of length K, including (K-$H\_select$) bits which equal (K-$H\_select$) bits of the K-bit address, and $H\_select$ consecutive bits which are all zero; and
 a second output of length $H\_max$, including $H\_select$ consecutive bits of the K-bit address and ($H\_max$-$H\_select$) bits which are all zero.

Embodiment 4. The system according to any of the preceding embodiments wherein the logic circuit X combines two operands into a logic circuit output, and is characterized in that, when applied various times, on a first operand which is the same each time, and on a second operand which is different each time, then the various logic circuit outputs will all be different.

Embodiment 5. The system according to any of the preceding embodiments wherein the processor feeds the first output into the single hash function, yielding a hash output, of length $H\_max$, which is independent of the $H\_select$ bits and which is fed to the logic circuit X.

Embodiment 6. The system according to any of the preceding embodiments wherein the logic circuit X receives the second output from the processor, and generates the logic circuit output, comprising the cache address of length $H\_select$, from the hash output of length $H\_max$ and from the second output, and wherein the K-bit address is mapped to the cache address of length $H\_select$.

Embodiment 7. The system according to any of the preceding embodiments wherein the logic circuit X combines two operands into a logic circuit output, and is characterized in that, when applied various times, on a first operand which is the same each time, and on a second operand which is different each time, then the various logic circuit outputs will include at least one pair of outputs which are different.

Embodiment 8. The system according to any of the preceding embodiments wherein the first output includes (K-H_select) most significant bits which equal the (K-H_select) most significant bits of the K bit address, and H_select least significant bits which are all zero; and wherein the second output includes the H_select least significant bits of the K-bit address and (H_max-H_select) bits which are all zero.

Embodiment 9. The system according to any of the preceding embodiments wherein the processor also receives at least one indication of positions of the H_select consecutive bits within the K-bit address.

Embodiment 10. The system according to any of the preceding embodiments wherein the indication of positions comprises a client's input.

Embodiment 11. The system according to any of the preceding embodiments wherein the processor receives indications of plural positions of H_select consecutive bits within the K-bit address.

Embodiment 12. The system according to any of the preceding embodiments and wherein the processor includes plural extractors, each of which generates, for a different respective position P from among the plural positions:
 a first output of length K, including H_select consecutive bits, at position P, which are all zero and (K-H_select) remaining bits which equal the (K-H_select) bits of the K bit address; and
 a second output of length H_max, including the H_select consecutive bits of the K-bit address, at position P, and (H_max-H_select) remaining bits which are all zero.

Embodiment 13. The system according to any of the preceding embodiments wherein each extractor n=0, 1, . . . from among the plural extractors, feeds its own second output to the logic circuit X.

Embodiment 14. The system according to any of the preceding embodiments, wherein each extractor n=0, 1, . . . from among the plural extractors, feeds its own first output to extractor n+1 and wherein extractor n-1 feeds its first output to the single hash function.

Embodiment 15. The system according to any of the preceding embodiments wherein at least one of the plural applications reads non-contiguous but equally spaced data in the memory.

Embodiment 16. The system according to any of the preceding embodiments wherein at least one of the plural applications reads contiguous data in the memory.

Embodiment 17. The system according to any of the preceding embodiments wherein all of the plural applications are known, e.g., to the processor, to read contiguous data in the memory, and none of the plural applications read non-contiguous data from the memory, and, therefore, the processor receives no indication of positions of the H_select consecutive bits within the K-bit address, and, instead, the first output always includes (K-H_select) most significant bits which equal the (K-H_select) most significant bits of the K bit address, and H_select least significant bits which are all zero; and the second output always includes the H_select least significant bits of the K-bit address and (H_max-H_select) bits which are all zero.

Embodiment 18. The system according to any of the preceding embodiments and comprising at least one of:
 a switch, NIC, CPU or GPU
 in which the cache resides.

Embodiment 19. The system according to any of the preceding embodiments wherein the logic circuit X comprises XOR circuitry.

Embodiment 20. A caching method typically operative in conjunction with a memory including memory cells and a cache, which typically includes cache cells numbering less than the memory cells and which is typically utilized by plural applications, the caching method comprising:
 for at least one given application from among the plural applications, which typically utilize plural respective subsets, of different sizes, from among the cache cells, defining, at least once, a configurable number of cache cells which the given application utilizes ("H_select"); and
 using only a single hash function which compresses memory addresses to cache memory addresses, rather than plural hash functions, to provide perfect hashing for each of the plural applications, typically by providing, to a logic circuit X, at least an output of the single hash function and/or ensuring that inputs, which differ only by H_select bits, map to distinct hash values typically with no collisions, by generating, e.g., as a logic circuit output, a cache address e.g., of length H_select, to which each K-bit address, associated with the given application, may be mapped.

Embodiment 21. The method according to any of the preceding embodiments wherein at least one application of the plural applications uses every n'th cache cell, in order, from among the cache's cells, where n is configurable.

Embodiment 22. The method according to any of the preceding embodiments wherein n=1 such that the at least one application uses the cache's cells sequentially.

Embodiment 23. The method according to any of the preceding embodiments wherein n>1 such that the at least one application uses the cache's cells non-consecutively.

Embodiment 24. The method according to any of the preceding embodiments wherein each cache cell includes a k-bit value and a key including k bits which indicate which k-bit memory cell stores the value and wherein plural consecutive sets of H_select bits are defined among the k bits of a given k_bit key which may be associated with a given application from among the plural applications, and wherein perfect hashing is ensured for the given application, for each of the plural consecutive sets of H-select bits.

Embodiment 25. The system according to any of the preceding embodiments and comprising:
 memory including $2^K$ memory cells, at least some of which are not disabled; and
 a cache including $2^{H\_max}$ cache cells.

DETAILED DESCRIPTION OF CERTAIN EMBODIMENTS

Hashing is a function that compresses a key, whose size is K, to a smaller hash value (a hash value of size H<K, where "size" may refer to the number of bits). A "perfect" hash function h for a set S of keys (say), is a hash function which maps distinct elements e.g., keys in S with zero collisions. Thus, if h(k1)=h(k2) where k1, k2 are key values, then k1=k2 and there are no occurrences of different key values which map to a single hash cell (no collisions).

Because hashing compresses data, hashing may be used to store data parsimoniously in linear tables. A table which is "linear" may have columns X, Y, and each time X increases by 1, Y increases by a constant rate.

Some applications (e.g., ECMP, data-caches) allow clients to configure the table size, e.g., at run-time, or after tape-out, or by user demand. For caches, the cache-table-size typically matches or equals the target hash-size or H_sel herein. The term tape-out is intended to include any final design (e.g., final graphic for a photomask of an integrated circuit or PCB), yielded by an integrated circuit design process or printed circuit board (PCB) design process, which is then sent to a fabrication facility which, accordingly, manufactures the integrated circuit or PCB.

Some applications would benefit from having a contiguous part of the key (e.g., bits [x+H−1: x] perfectly hashed, while also keeping H, the target hash-size, configurable by the client, rather than having target hash-size H set by the system designer, hence non-configurable. Yet, application designers tend to support either perfect hashing or configurable target hash-size "H"—but not both. Other applications provide both perfect hashing and configurable size, for only a finite set of "H" values 00 e.g., by generating a different hash-function for each "H" value. This solution's cost is 0 (number of different "H" values designer optimizes for)*(cost of hash function).

Figure 1:
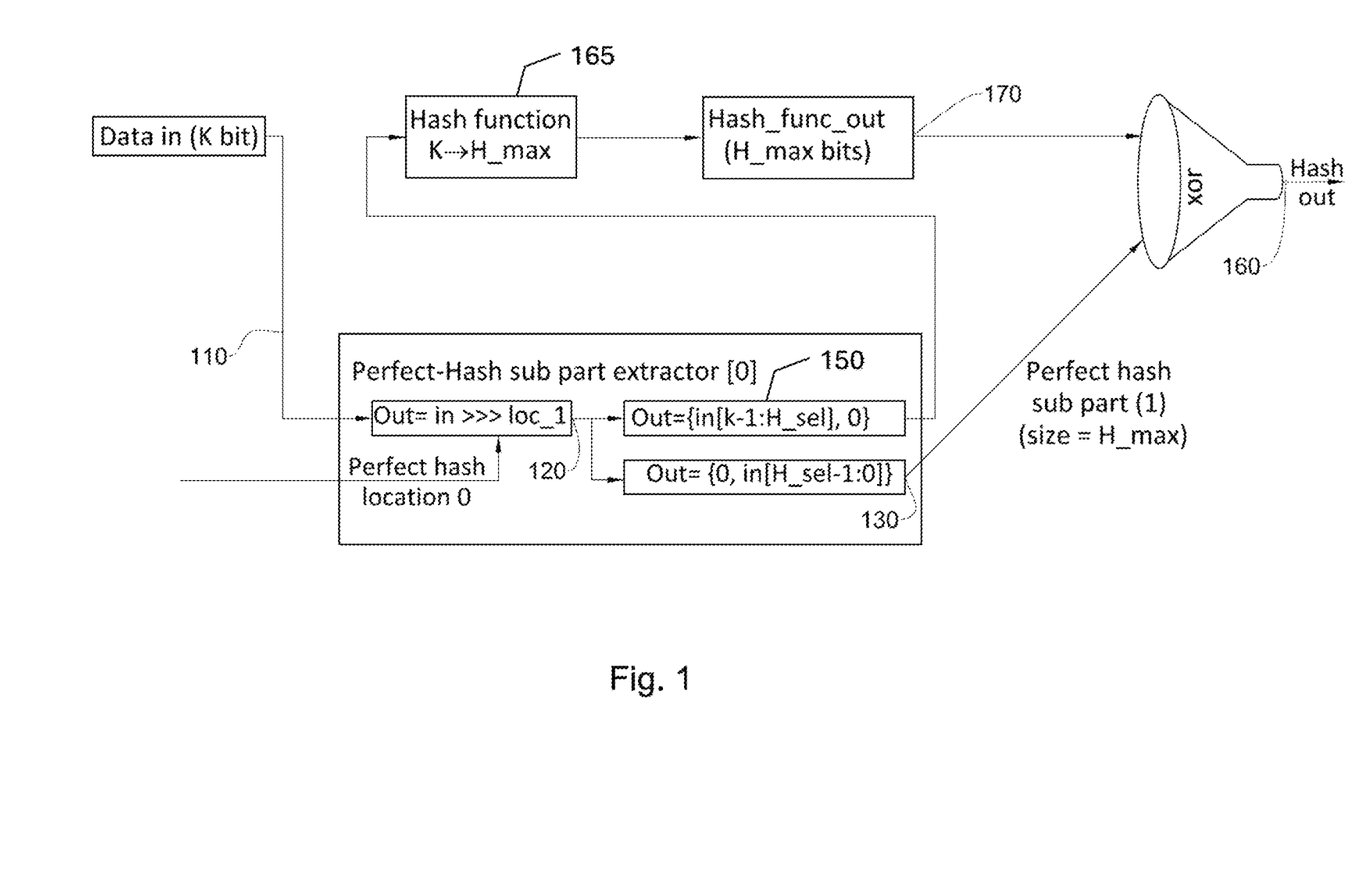
FIG. 1 is a simplified block diagram illustration of a hashing system according to an embodiment of the invention.

FIG. 1 illustrates a caching system operative in conjunction with a memory and a cache, which includes a processor, typically implemented in hardware, which may use only a single hash function (e.g., for all sizes of cache cell subsets allocated to applications) which compresses K bit memory addresses to H_max bit cache addresses, rather than plural hash functions, to provide perfect hashing for each of plural applications which utilize plural respective subsets, of different sizes, from among 2^H_max cells in the cache. The terms "memory" and "database" may be interchanged herein. It is appreciated that K-bit memory may or may not have 2^K memory cells; for example, a memory system may have ((2^K)−1) or less memory cells (by disabling one or more memory entry/ies).

The processor also may include one or more perfect-hash sub-part extractors aka perfect-hash sub-part circuitry performing pre-processing e.g., as described in detail below.

The system of FIG. 1 also includes a logic circuit X, such as a XOR, which receives, as one of its input operands, an output, H_max bits in length, of the single hash function, and generates, as a logic circuit output, a cache address of length H_select to which at least one K-bit address is mapped where H_max<K, to ensure that input operands which differ only by H_select<=H_max bits, map to distinct hash values with no collisions. Typically, the logic circuit X combines 2 operands into a logic circuit output and is characterized in that, when applied various times, on a first operand which is the same each time, and on a second operand which is different each time, then the various logic circuit outputs will all be different.

The logic circuit X may include any linear function (such as, by way of non-limiting example, a sum or XOR of the function's inputs. The function typically merges two inputs aka input operands, e.g., a hash output and an H_select bit extraction, to a single output, that constitutes a perfect hash for the H_select bits. It is appreciated that the parameter H_select may be used to define a subset of the 2^H_max cache lines, of size 2^H_select.

Typically, the function is configured to cyclically shift its input, typically using a configurable cyclic shifter, such that, after the shift, the H_select bits (e.g., the bits which are desired to be perfectly hashed) are stored as the least-significant-bits of the output and are thus, subsequently, convenient to extract, simply by taking the H_select least-significant-bits.

Typically, the perfect-hash sub part extractor implements extraction of certain chosen bits, numbering H_select bits, from a configurable location within the K bits. Typically, K−H_select bits are included in a first output of the extractor (which may be fed to the hash function). Typically, the H_select chosen bits are included in the second output (aka "perfect hash subpart") of the extractor (which may be XORed with the H_max sized hash output). The size of the second output is typically maintained at H_max e.g., by padding with zeros. In the perfect-hash sub part extractor of FIG. 1, the Out=in>>>loc_1 module typically comprises a cyclic shift such as, for example: In=0x1234_5678_cafe Loc_1=2

Out=in >>>loc_1=0xfe12_3456_78ca, where loc_1 Is a first location in the subset of the input that will be perfectly hashed.

The ampersand (&) signifies a "logical AND" operator. The symbol ^ signifies exponentiation.

It is appreciated that XOR as described herein is but one non-limiting example of a function which, when applied plural times, on a first operand which is the same each time, and on a second operand which is different each time, yields plural function outputs which will all be different. Thus, the XOR circuitry shown herein is an example of circuitry which is useful in preventing undesirable collisions, e.g., in caching use-cases, all as described in detail herein.

Also, the three modules within the extractor of FIG. 1 are merely an exemplary implementation achieving extraction of the chosen bits e.g., provision of different outputs, one of which includes the chosen bits, and the other of which does not.

The flow through FIG. 1 may for example be as follows:

As indicated by reference numeral 110 the original K-bit key arrives at the perfect-hash sub part extraction circuitry. The extraction circuitry's first module, indicated by reference numeral 120 (which, typically, receives a perfect hash location input) rotates the original key, such that the 'interesting' portion of the key (the chosen bits e.g.) occurs at bits [H_sel−1: 0] (e.g., at the least significant bits); the rotated key is then provided to the extraction circuitry's remaining (second and third/top right and bottom right) modules 150 and 130. The extractor's third module, indicated by reference numeral 130, then generates a second output whose size is H_max_which includes only the H_select interesting or chosen or desired bits, padded with '0' to yield a "perfect hash subpart", e.g., a portion of the key which is subject to "perfect hashing" (which may be XORed with the hash output which is imperfectly hashed) max. The "perfect hash subpart" typically includes the subset (of size H_select) of the H_max bits that is to be perfectly hashed. Thus typically, given 2H_sel keys, that differ only in a single such subpart, the system ensures perfect hashing although given 2H_sel keys that differ in two such subparts, perfect hashing is not guaranteed, where ** denotes exponentiation.

It is appreciated that typically, module 130 in the extraction circuitry receives an H_select input from a client of the system. Initially the cache key is rotated without the H_select interesting or chosen bits, with '0' inserted to replace those bits to maintain a length of K. Typically, the extraction circuitry's second (top right) module 150 rotates the key again to extract another portion of the key for perfect hashing, thereby to yield a first output of the extraction circuitry (which may be fed to a hash function 165). The hash output is shown at reference numeral 160; the size of this hash out is H_max. It is appreciated that given two different keys k1 and k2 which are pushed to the system, and which have different sub-parts, or portions, or bit-positions chosen for them by the perfect hash sub-part extraction circuitry of FIG. 1, the hash func-out will nonetheless be the same for both packets, whereas the perfect hash subparts of the two packets will differ. As shown at reference numeral 170, the number of bits of the XOR output is typically reduced from H_max to, or according to, H_sel.

According to certain embodiments, the hash output, of length H_max, is "independent" of the H_select bits and which is fed to the logic circuit X. Given an input to a function e.g., hash-function, and some output of the function e.g., a "hash output" of the hash-function, the hash output is considered "independent" of certain bits (e.g., of H_select bits) if the hash output does not change, even if the H_select bits in the input do change. Thus, if certain bit(s) not included in the H_select bits change, the hash-out may change, and thus the output may be considered to depend on those bits, however, if bit(s) from among the H_select bits change, the hash-output, if independent of those bits, will not change.

The hash may comprise, by way of non-limiting example, polynomial division, Fowler-Noll-Vo (or FNV), SHA-512, and so forth.

It is appreciated that the system of FIG. 1 provides, in effect, hashing circuitry which inputs K bits and outputs a configurable number of bits, H_sel<K, by compressing the K input bits to H<K bits. The circuitry pre-processes (for example, in the extractor which generates the 2 outputs) H_sel bits from among of the K input key bits, to perfectly hash those H_sel bits to H_sel bits, since hashing a number of bits to the same number of bits is always a perfect hash. It is appreciated that this is not intended to be limiting; for example, multiplication by any number relatively prime to 2 is an alternative which also may be used to yield the perfect hashing, as required.

Figure 2:
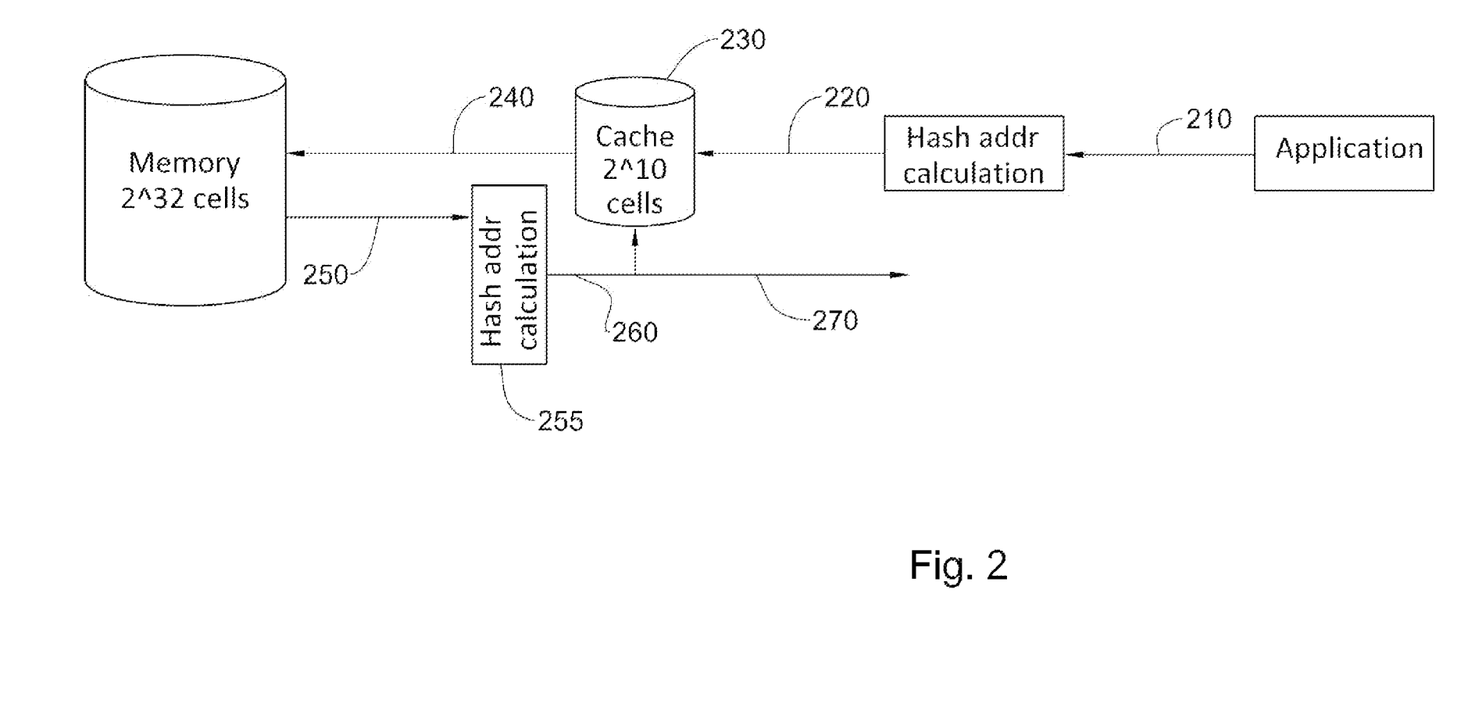
FIG. 2 is a simplified block diagram illustration of a use case for a hashing system such as the hashing system of FIG. 1.

Reference is now made to FIG. 2 which illustrates a use-case for the system of FIG. 1, in which a key whose size is K, is compressed. FIG. 2 illustrates a memory/database with K cells, a cache with H cells, an application which seeks to access a certain K-bit (say 32-bit) address in the database; and a "hash address calculator", typically on both sides of the cache, which ensures perfect hashing, even when the hash size is configurable rather than being constant. The "calculator" receives the K-bit input and (e.g., as described herein with reference to FIG. 1) returns an H-bit output which may then be used to access the cache. Thus, one use-case of the system of FIG. 1 is that the data_in may be a key, and the system returns an H-bit cache address each time the application seeks to access content of a given database address.

It is appreciated that a single application in FIG. 2 is illustrated for simplicity, however, more generally, multiple applications may make use of a single cache. It is appreciated that a given application may not use all of the cache; instead, only a subset of size s1 from among the s cells in the cache may be allocated by a client to a given application 1, whereas a different subset of size s2 from among the s cells in the cache may be allocated by the client to a given application 2. Allocating only some of the cache to each given application may, for example, allow the cache to serve several applications simultaneously. The system designer typically does not know in advance how large a portion of the cache will be allocated to various application/s, and, therefore, the system herein takes into account that the size of cache each application may require, is unknown at the time of design. For example, if the cache is 1 M in size (H_max=1 M), 3 different applications may use the entire cache, or only half or a quarter of the cache (H_select=1 M, 0.5M and 0.25M, respectively, for the 3 applications). Sometimes, plural mapping functions are used, one for each size of subset that may be allocated by a client to a given application. However, plural hash functions are costly in terms of space required in the ASIC; the embodiment of FIG. 3, described in detail below, is more parsimonious.

It is appreciated that some applications use random addresses in the cache, whereas other applications use sequential or consecutive addresses in the cache, which tends to improve performance. More generally, different applications have use of different patterns of addresses, within the database. For example, one "simple" application may access addresses contiguously e.g., starting from memory address 100, then memory addresses 101, 102, etc. Other applications may access addresses non-contiguously e.g., may access memory address 100, then addresses 104, 108, 112 etc., skipping by 4, or an application may access addresses 100, 108, 116, etc., skipping by 8. It is appreciated that if a simple application reads contiguous or consecutive or continuous data from the DB, e.g., from address 1,000,000 to address 1,000,000+2^10 continuously, this pattern read creates a stream of addresses that differ from one another by the 10 LSB (bits 9, 8, 7 . . . 0), such that the H-select bits may be the LSBs. However, there may be many reasons why applications read content, from the memory cells of the database, which is non-contiguous, yet equally spaced e.g., skipping by 2 thus reading memory addresses 1,000,000, 1,000,002, 1,000,004, and so forth, till, say, 1,000,000^2*(2^10). For example, perhaps a given database has a data structure of size 2 (e.g., student name, student grade) and a given application wants to read all the students' grades without reading the students' names; this read pattern creates a stream of addresses that differ from one another by bits (10, 9, 8, . . . 3, 2, 1) meaning 10 bits starting from bit 1. Since, according to certain embodiments, the H-select bits need not be the LSBs, these embodiments support a client's choice of whichsoever type/s of reads to optimize the application for, by using advanced embodiments herein which support choice of H_select bits which are not necessarily LSBs, or even by choosing several sets of H_select bits e.g., as per the embodiment of FIG. 3 described in detail below.

Embodiments herein which support choice of H_select bits which are not necessarily LSBs are useful, for example, when equally spaced but non-contiguous data is being read by certain application/s, whereas choosing the LSBs or MSBs as the H_select bits is useful for example when the data being read by a given application is contiguous.

It is appreciated that the cache shown and described herein may be a hardware component which may reside in a switch, Nic, CPU, GPU, or any other suitable hardware system. The term "cache" is used herein to include any storage of size s which is cheaper or faster for a given system to access, than it would be for the given system to access a database of size S>s, and, therefore, some of the data in the database, typically data which is frequently used and/or was recently used, is stored in the storage of size s, whereas other data, which may be less frequently used and/or less recently used, is not stored in the storage of size s (cache). For example, perhaps S is 1 billion, whereas s is only 100.

It is appreciated that the applicability of the embodiments herein is not limited to key-compression in caching use-cases, and, alternatively, or in addition, embodiments herein may be used to facilitate other hashing/compression tasks as well.

An example flow through the system of FIG. 2 is now described in detail. As shown in FIG. 2 at reference numeral 210, a given application may read data where the address runs from (by way of example) memory cell 1,000,000 till memory cell 1000,000+2^10. The illustrated embodiment assumes, by way of non-limiting example, that the cache includes 2^10 cells.

Figure 3:
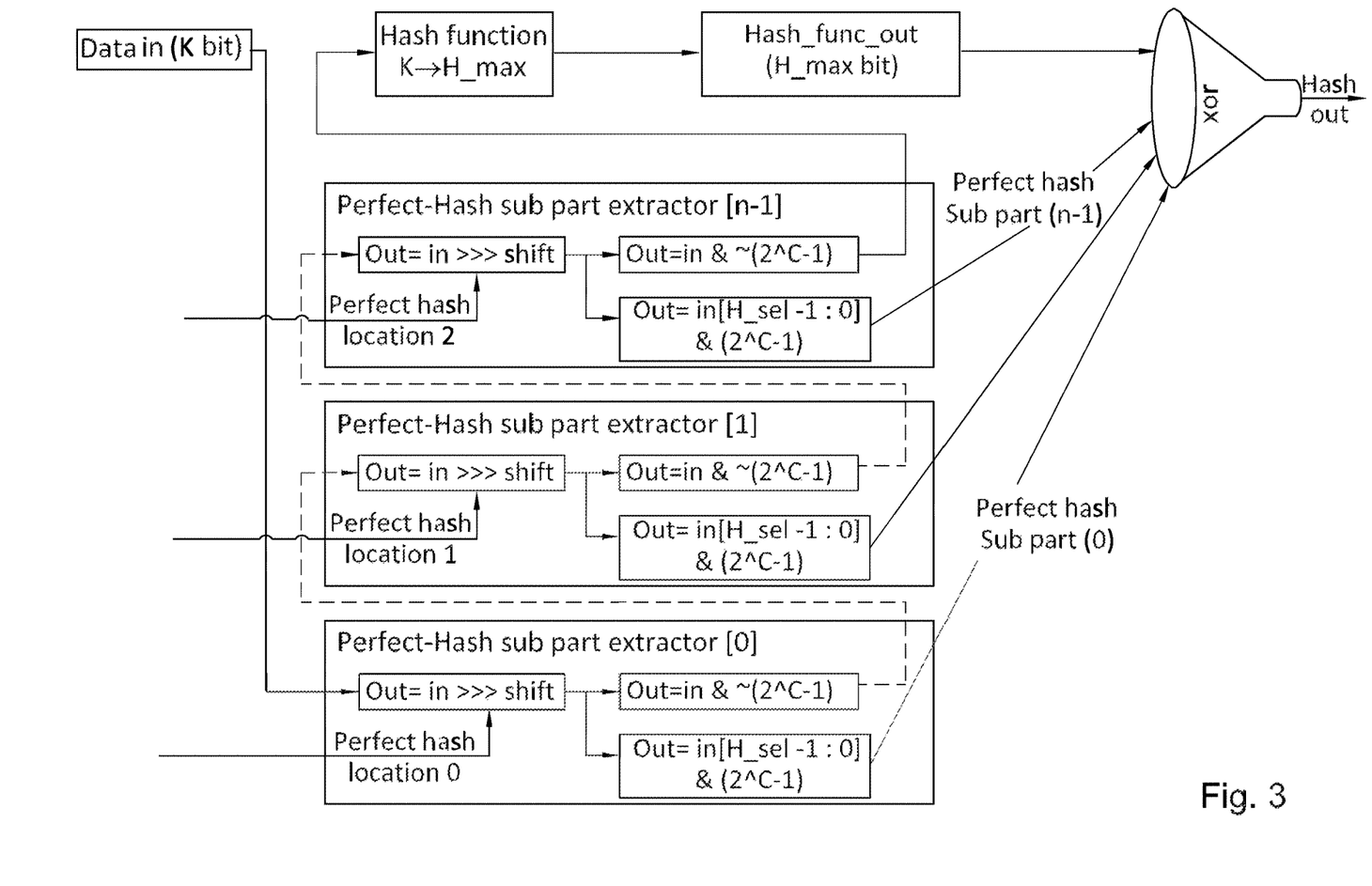
FIG. 3 is a simplified block diagram illustration of a hashing system according to another embodiment of the invention, where typically, C=H_sel.

It is appreciated that the hash address calculation logic of FIG. 2 may comprise a hash function which does not ensure perfect hashing, hence impedes performance each time a collision occurs due to the imperfect hashing or may comprise any of the apparatus of FIG. 1 or of FIG. 3, which does ensure perfect hashing, hence enhances performance by preventing collisions.

As shown at reference numeral 220 hash address calculation logic computes cache addresses, and then there is an attempt to read cache addresses as calculated by the hash address calculation logic. Initially however, the cache 230 is empty, and thus all cache queries initially fail, triggering a need to revert to the main DB which is shown as a 2 exp 32 cell memory by way of example. The data read, from addresses 1,000,000 . . . 1000,000+2^10 (by way of example) in the main database, is shown at reference numeral 240. The resulting response data supplied by the main database for addresses 1,000,000 . . . 1000,000+2^10 is shown at reference numeral 250.

As shown at reference numeral 260, the system may now try storing the DB response in the cache according to the addresses calculated by the hash-addr calculation. However, as shown at reference numeral 255, if the hash function does not guarantee perfect hashing for H_select=10 address bits (assuming H_select=10 in the illustrated example), then some of the hash addresses may collide, and the cache then typically stores only a single value stored at a single address from among all colliding addresses.

A non perfect hash may create a collision by mapping two DB addresses to the same cache address e.g., both of DB Addresses 1,005,400 and 1,470,304 to hash addr=100, as follows:

DB Addr=1,005,400→hash addr=100

DB Addr=1,470,304→hash addr=100

In this case the cache can only store 1 of those data items, but not both. Typically, a cache policy exists, which determines which colliding address's value is stored in the cache and which is/are removed (e.g., in the above example, the policy may determine whether the content of database address 1,005,400 should be stored at cache address 100, and the content of database address 1,470,304 be removed or discarded, or the other way around.

In contrast, a perfect hash for 10 bits, which may be provided in accordance with any embodiment of the present invention, will map the addresses 1,000,000 . . . 1,000,000+ 2^10 to 2^10 different addresses. The term "map" is used herein to refer to a "mapping" function which inputs a "long" (say, 20 bit long) address from among the S database addresses, and outputs a compressed, "short" (say 10 bit long) address from among the s cache addresses (say if s=1024). It is appreciated that since s is smaller than S (typically at least one order of magnitude smaller), plural database addresses are mapped to each cache address.

Eventually, if a perfect hashing is used, e.g., in accordance with any embodiment of the present invention, all the 2^10 DB entries will reside back in the cache. Next time they are read, the cache will respond to the application, which will then have no need to query the main DB, resulting in superior performance, in terms of power and/or latency, relative to a situation in which non perfect hashing is used, in which case some of the 2^10 entries are not stored in the cache, resulting in the application being forced to resort to querying the main database in order to return data to the requester (reference numeral 270) the next time (or each time) those data are required by the application.

Referring now to FIG. 3 by way of example, it is appreciated that the chosen bits can be, but need not be, the last H_select bits i.e., need not be the LSBs of the k input bits. More generally, according to certain "advanced" embodiments, the chosen bits may, for example, be any set of consecutive bits from among the k input bits, rather than the LSBs necessarily being the chosen bits.

In FIG. 3, as shown, the system includes plural perfect-hash sub part extractors 0, 1, . . . n−1 rather than a single perfect-hash sub part extractor as in the embodiment of FIG. 1. This is because one embodiment, as shown in FIG. 1, allows the client to choose a single set of H_select bits that will yield perfect hashing, whereas another embodiment, as shown in FIG. 3, allows the client to choose more than one set of H_select bits that will each yield perfect hashing. Since the chosen bits, H_select in number, need not be the LSBs, there are many possible sets of chosen bits, each numbering H_select bits. Therefore, the system may support allowing a client to select several different positions for the h_chosen bits that will each yield perfect hashing, rather than only one such position. Each set of H_select may reside anywhere within the k_bit original key.

As shown, typically, the first module 120 of extractor 0 gets the data_in input. The first output of each extractor goes to the first module 120 of the next extractor e.g., extractor 0's first output is fed to extractor 1's first module 120. The second outputs of all extractors in FIG. 3 are typically all fed to the XOR.

The following numerical example is provided to facilitate understanding of embodiments of the invention. Assume Key-size=K=80 bits, H_max=32 bits and H_select=10 bits. Now assume that the Perfect hash location in FIG. 1 includes memory locations [9, 8, 7, . . . 0], where "Perfect_hash_location" refers to the location/s of the H_select chosen bits i.e., the set of H_select bits that the client seeks to map perfectly. Now assume the data_in includes the following keys (e.g., in a caching use-case):

Key_1=0x1234_5678_1234_5678_0001
Key_2=0x1234_5678_1234_5678_0002
Key_3=0x1234_5678_1234_5678_0003.

Under these assumptions, the first output of the perfect-hash sub part extractor in FIG. 1, which is also the input operand for the hash function, comprises:

For Key_1:0x1234_5678_1234_5678_0000
For Key_2: 0x1234_5678_1234_5678_0000
For Key3: 0x1234_5678_1234_5678_0000

Under these assumptions, the second output of the perfect-hash sub part extractor in FIG. 1, which is also the second input operand for the XOR, comprises:

For Key_1: 0x0000_0001
For Key_2: 0x0000_0002
For Key_3: 0x0000_0003

What Comes Out of the Hash
Hash Input
Top Black Box Output
    For Key_1: 0x1234_1234_1234_1234_0000
    For Key_2: 0x1234_1234_1234_1234_0000
    For Key_3: 0x1234_1234_1234_1234_0000
Black Box Output
    For Key_1: 0×cafe_cafe (32 bit)
    For Key_2: 0×cafe_cafe
    For Key_3: 0×cafe_cafe The logic circuit output (e.g., XOR output), still using the same example, is:
    For Key_1: 0×cafe_cafe_caf9
    For Key_2: 0×cafe_cafe_cafa
    For Key_3: 0×cafe_cafe_caf8.

The embodiments herein may, for example, be incorporated into a switch or network interface card, such as, by way of non-limiting example, the Spectrum-4 switch or NVIDIA® ConnectX® family of Ethernet smart network interface cards (SmartNICs).

The term "all" is used herein for simplicity, to describe example embodiments. It is appreciated, however, that, alternatively, whatever is said herein to be true of or to characterize, or to pertain to, "all" members of, or "each" member of, or "every" member of, a certain set, can also, in other embodiments, be true of, or characterize, or pertain to, most but not all members of that set, or all but a few members of that set, or at least one (but less than all) member/s of the set.

It is appreciated that software components of the present invention may, if desired, be implemented in ROM (read only memory) form. The software components may, generally, be implemented in firmware or hardware, if desired, using conventional techniques. It is further appreciated that the software components may be instantiated, for example as a computer program product, or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments, may also be provided in combination in a single embodiment. Conversely, various features of the invention which are, for brevity, described in the context of a single embodiment, may also be provided separately, or in any suitable sub-combination.

It will be appreciated by persons skilled in the art that the present invention is not limited by what has been particularly shown and described hereinabove. Rather the scope of the invention includes, inter alia, the appended claims and equivalents thereof.

The invention claimed is:

1. A memory system, comprising:
a memory comprising a first plurality of memory cells, having respective memory addresses of a first length K bits;
a cache comprising a second plurality of cache cells, smaller than the first plurality, having respective cache addresses of a second length H_max bits, such that H_max<K; and
caching logic, to receive an input from a client selecting a set of H_sel bits within the K bits of the memory addresses, such that H_sel≤H_max, to map any given memory address to a corresponding cache address by:
extracting the selected set of H_sel bits from the given memory address;
applying a hash function to the K-H_sel bits of the given memory address remaining after extraction of the selected set of H_sel bits to give a hash result; and
combining the hash result with the extracted set of H_sel bits to give the corresponding cache address such that for any given value of the remaining K-H_sel bits, each different value of the selected set of H_sel bits maps to a different, respective cache address, and
to store data from the given memory address to the corresponding cache address.

2. The system according to claim 1, wherein the selected set of H_sel bits are the least significant bits of the memory addresses.

3. The system according to claim 1, wherein the selected set of H_sel bits are not the least significant bits of the memory addresses.

4. The system according to claim 3, wherein the caching logic comprises a rotator, to rotate the memory addresses so that the selected set of H_sel bits is shifted to a position of the least significant bits before extracting the selected set of H_sel bits.

5. The system according to claim 3, wherein the selected set of H_sel bits is non-contiguous within the memory addresses.

6. The system according to claim 1, wherein the hash result has a hash length of H_max bits.

7. The system according to claim 1, wherein combining the hash result comprises computing an exclusive OR function (XOR) between the hash result and the extracted set of H_sel bits.

8. The system according to claim 1, wherein the caching logic is to receive selections of different, respective sets of bits within the K bits of the memory addresses for use in mapping the memory addresses to the cache addresses for different client applications.

9. The system according to claim 8, wherein the selections of the different, respective sets of bits comprise different, respective numbers of the bits for the different client applications.

10. A method for caching data in a memory system, which includes a memory, including a first plurality of memory cells having respective memory addresses of a first length K bits, and a cache, including a second plurality of cache cells, smaller than the first plurality, having respective cache addresses of a second length H_max bits, such that H_max<K, the method comprising:
receiving an input from a client selecting a set of H_sel bits within the K bits of the memory addresses, such that H_sel≤H_max;
mapping a given memory address to a corresponding cache address by :
extracting the selected set of H_sel bits from the given memory address;
applying a hash function to the K-H sel_bits of the given memory address remaining after extraction of the selected set of H_sel bits to give a hash result; and
combining the hash result with the extracted set of H_sel bits to give the corresponding cache address such that for any given value of the remaining K-H_sel bits, each different value of the selected set of H_sel bits maps to a different, respective cache address, and
storing the data from the given memory address to the corresponding cache address.

11. The method according to claim 10, wherein the selected set of H_sel bits are the least significant bits of the memory addresses.

12. The method according to claim 10, wherein the selected set of H_sel bits are not the least significant bits of the memory addresses.

13. The method according to claim 12, and comprising rotating the given memory address so that the selected set of H_sel bits is shifted to a position of the least significant bits before extracting the selected set of H_sel bits.

14. The method according to claim 12, wherein the selected set of H_sel bits is non-contiguous within the memory addresses.

15. The method according to claim 10, wherein the hash result has a hash length of H_max bits.

16. The method according to claim 10, wherein combining the hash result comprises computing an exclusive OR function (XOR) between the hash result and the extracted set of H_sel bits.

17. The method according to claim 10, wherein receiving the input comprises receiving selections of different, respective sets of bits within the K bits of the memory addresses for use in mapping the memory addresses to the cache addresses for different client applications.

18. The method according to claim 17, wherein the selections of the different, respective sets of bits comprise different, respective numbers of the bits for the different client applications.

* * * * *